US005177431A

United States Patent [19]

Smith et al.

[11] Patent Number: 5,177,431

[45] Date of Patent: Jan. 5, 1993

[54] LINEAR PROGRAMMING CIRCUIT FOR ADJUSTABLE OUTPUT VOLTAGE POWER CONVERTERS

[75] Inventors: David A. Smith, Kowloon, Hong Kong; Carl K. Sawtell, San Jose, Calif.

[73] Assignee: Astec International Ltd., Hong Kong

[21] Appl. No.: 765,388

[22] Filed: Sep. 25, 1991

[51] Int. Cl.[5] .............. G05B 24/02

[52] U.S. Cl. .............. 323/349; 323/274; 323/281; 323/313; 323/284

[58] Field of Search .............. 323/273, 274, 281, 313, 323/349, 282, 284, 351

[56] References Cited

U.S. PATENT DOCUMENTS

| | | | |
|---|---|---|---|
| 4,538,102 | 8/1985 | Takagi et al. | 323/349 |
| 4,598,243 | 7/1986 | Kawakami | 323/349 |
| 4,868,483 | 9/1989 | Tsujimoto | 323/313 |
| 4,954,767 | 9/1990 | Buisson et al. | 323/351 |
| 4,983,905 | 1/1991 | Sano et al. | 323/274 |
| 5,077,518 | 12/1991 | Han | 323/281 |

*Primary Examiner*—Steven L. Stephan
*Assistant Examiner*—Jeffrey Sterrett
*Attorney, Agent, or Firm*—McCubbrey, Bartels, Meyer & Ward

[57] ABSTRACT

An adjustable power converter which allows the output voltage of the power converter to be controlled linearly by a programming resistor or a programming voltage is provided. The adjustable power converter includes a linear programming circuit which generates a current as a linear function of the programming voltage or the resistance of the programming resistor. The current is connected to the feedback loop of a conventional power converter such that the output voltage of the power converter is a linear function of the current. As a result, the output voltage of the power converter can be linearly adjusted by adjusting the programming voltage or the programming resistor.

24 Claims, 5 Drawing Sheets

LINEAR PROGRAMMING CIRCUIT FOR ADJUSTABLE OUTPUT VOLTAGE POWER CONVERTERS

BACKGROUND OF THE INVENTION

A power converter is a device, well known in the art, for converting a DC source voltage, typically unregulated, to a regulated DC voltage for powering a load. The power converter typically has a nominal output value, which is the steady state output voltage generated by the power converter when it is not being adjusted by a user or otherwise affected by short term changes in load demand. It is sometimes desirable to allow the user to adjust the voltage level of the regulated output up or down from the nominal value. One of the applications of a different regulated voltage level is in testing for the existence of race conditions in logic circuits. A race condition is a type of fault in a digital circuit wherein some of the states of the digital circuit could have unpredictable values depending on the propagation delay of the circuit elements in the circuit. One of the ways for detecting the existence of a race condition in a logic circuit is by examining the state of the output while varying the output voltage of the power converter which supplies power to the circuit.

It is also desirable to design a system such that a user can adjust the regulated output voltage easily. The prior art adjustable power converters typically have a nonlinear relationship, such as an exponential relationship, between the adjustment signal and the output voltage. In the case of an exponential relationship, a large initial adjustment signal needs to be applied to the power converter in order to obtain a small deviation from the nominal voltage. When the deviation from the nominal value is large, a small amount of additional adjustment signal would lead to a large change in the output voltage. As a result, it would be difficult for a user to apply the right amount of adjustment signal in order to obtain the desirable regulated output voltage. On the other hand, if the power converter has a linear relationship between the adjustment signal and the output voltage, the same increment in adjustment signal would produce the same variation in output voltage regardless of the extent of deviation of the output voltage from the nominal value. Thus, it is easier for a user to obtain a desired output voltage if the relationship between the adjustment signal and the output voltage is a linear relationship.

FIG. 1 is an example of a conventional power converter 10. Power converter 10 generates a regulated output voltage $V_{out}$ at a pair of output ports 11, 12. Power converter 10 comprises a power stage 20 for converting DC power from an external voltage source $V_{in}$, typically unregulated, to an output DC voltage. Power converter 10 further comprises an error amplifier 32, a reference voltage source 30, and two resistors 24 and 26. The combination of power stage 20, error amplifier 32, reference voltage source 30, and resistors 24 and 26, described below, forms a feedback loop such that the output voltage $V_{out}$ of power converter 10 is regulated.

Power stage 20 includes a control port 18, an input power port 14 coupled to the external DC voltage source $V_{in}$, and an output power port 16 for outputting a voltage which is a function of a signal at control port 18. Output power port 16 is coupled to resistors 24, 26 which are connected in series between ports 11 and 12. Resistors 24, 26 form a voltage divider for generating a comparison voltage at a node 28 so that when the output voltage at ports 11 and 12 is at the nominal value, the comparison voltage is the same as the voltage of reference voltage source 30.

Error amplifier 32 has an inverting input terminal 34, a noninverting input terminal 36, and an output terminal 38. Inverting input terminal 34 is coupled to node 28 and noninverting input terminal 36 is coupled to reference voltage source 30. Output terminal 38 is coupled to control port 18 of power stage 20. As explained below, error amplifier 32 and power stage 20 constitute a controller for generating across output ports 11, 12 a regulated output DC voltage from $V_{in}$ as a function of the difference between the voltages at input terminals 34, 36.

The operation of power converter 10 is well known in the art. When the output voltage at ports 11, 12 is above its nominal value, the comparison voltage at node 28 is above the voltage of voltage source 30. As a result, the voltage at output terminal 38 of error amplifier 32 is lowered. This lower voltage at output terminal 38, when coupled to control port 18 of power stage 20, reduces the voltage at output power port 16 of power stage 20. As a result, the output voltage at ports 11, 12 is reduced. Similarly, when the output result, the output voltage at ports 11, 12 is reduced. Similarly, when the output voltage at ports 11, 12 is below its nominal value, the comparison voltage at node 28 is below the voltage of voltage reference voltage source 30. Consequently, the voltage at output terminal 38 is raised resulting in an increase in the voltage at output power port 16 of power stage 20. As a result, a higher output voltage is produced at ports 11, 12. As a result of these corrective actions, the voltage at ports 11, 12 is maintained in regulation at the nominal value.

There are several methods for adjusting the voltage level of the regulated output so that it is different from the nominal value. One simple method is to replace the reference voltage source 30 by an adjustable voltage source. By changing the adjustable voltage source to a different value, the potential at node 28, and consequently the voltage level of the output at ports 11 and 12, also will change to a different value. As a result, the voltage level at output ports 11, 12 is maintained in regulation at this different voltage level.

The problem with the method described above is that it may not be possible to replace reference voltage source 30 by an adjustable voltage source. In most power converters, semiconductor integrated circuits are used to reduce the cost and size of the power converters. Typically, such integrated circuits contain an internal error amplifier and an internal reference voltage source coupled to one of the input terminals of the error amplifier. The reference voltage source and the input terminal coupled thereto are thus not accessible outside of the integrated circuit. Consequently, it is usually not possible to replace an internal reference voltage source by an external adjustable voltage source.

Another method for varying the voltage level of the regulated output is to replace one of the resistors 24, 26 by a variable resistor. The problem of this method is that the wiper of a variable resistor, being mechanical in nature, has a tendency to fail. If the wiper of the variable resistor fails, the voltage at output ports 11, 12 could rise to a dangerously high value. The consequence of such an event could be disastrous, because all the circuit elements in an electronic system which are connected to the power converter could be damaged or destroyed.

A common alternative is to place a resistor 39 in parallel with resistor 24, as shown in FIG. 1. The voltage at node 28 can be changed by varying the value of resistor 39. The problem with this method is that the output voltage across ports 11, 12 varies in a non-linear manner with the value of resistor 39. Such a non-linear relationship may confuse the user during voltage adjustment. As a result, the likelihood that a user will make a mistake increases.

SUMMARY OF THE INVENTION

Broadly stated, the present invention is an adjustable output voltage power converter for converting a DC voltage source to a regulated output voltage having a nominal value across two output ports. The adjustable power converter has an input port for accepting a programming signal for adjusting the level of the regulated output DC voltage about the nominal value as a substantially linear function of the programming signal. The adjustable power converter comprises a controller having a first input terminal and a second input terminal. The controller generates across the two output ports a regulated output DC voltage from the DC voltage source as a function of the difference between the signals at the first and second input terminals. The first input terminal of the controller is coupled to a reference voltage source having a fixed reference voltage. The adjustable power converter further comprises a means for generating a current as a substantially linear function of the programming signal and a means for generating a comparison signal as a linear function of the regulated output voltage at the output port and as a linear function of the current. The comparison signal is coupled to the second input terminal of the controller such that the level of the regulated output voltage is selectively above or below the nominal value by a predetermined amount.

Therefore, it is the object of the present invention to provide a power converter wherein the output voltage can be adjusted a selected amount above or below said nominal value.

It is another object of the present invention to allow adjustment of the output voltage of a power converter without using an adjustable reference voltage source.

It is a further object of the present invention to provide a linear relationship between the adjustment mechanism and the regulated output voltage.

It is also an object of the present invention to prevent the output voltage level of a power converter from exceeding a predetermined value.

These and other objects of the present invention will become apparent to those skilled in the art from the following detailed description of the invention and from the accompanying drawings.

BRIEF DESCRIPTION OF THE DRAWINGS

FIG. 3(*b*) is a graph showing the output voltage $V_{out}$ as a function of the programming voltage according to the present invention.

FIG. 4(*a*) is a drawing showing the generation of a current $I_0$ for the adjustable power converter of FIG. 4.

FIG. 5(*a*) is a drawing showing the generation of a current $I_0$ for the adjustable power converter of FIG. 5.

DETAILED DESCRIPTION OF THE INVENTION

Figure 2:
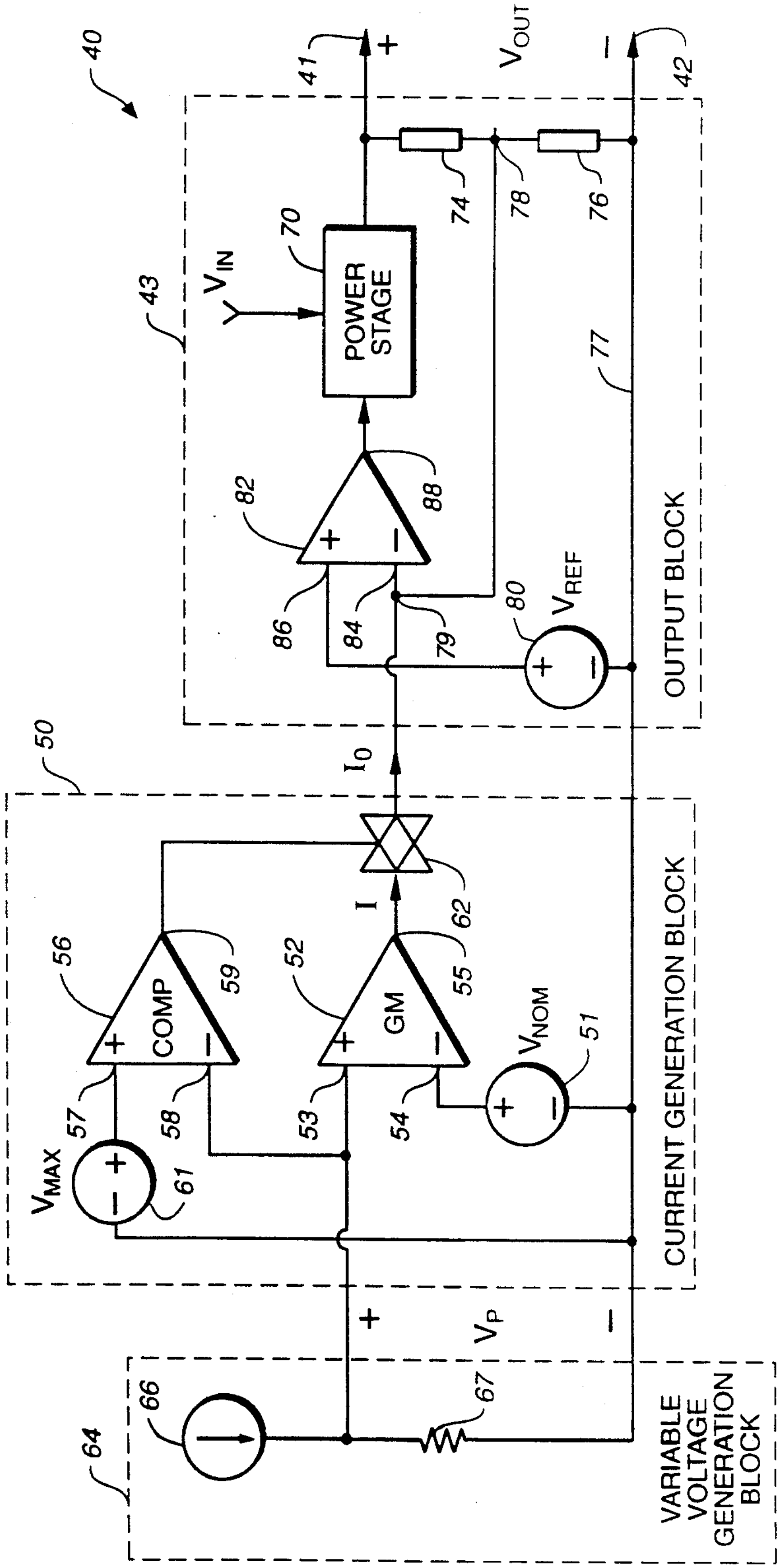
FIG. 2 is a schematic diagram of an adjustable power converter according to the present invention.

FIG. 2 is a schematic diagram of an adjustable power converter 40 according to the present invention. Adjustable power converter 40 comprises two output ports 41 and 42, an output block 43 for generating a regulated output voltage at ports 41 and 42, a current generation block 50 for generating or sinking a current having a magnitude $I_0$, and a variable voltage generation block 64 for generating a programming voltage $V_P$. Current $I_0$ flows into or out of a node 79 of output block 43, depending on whether current generation block 50 generates or sinks current. The magnitude and direction of current $I_0$ is controlled by programming voltage $V_P$.

Figure 1:
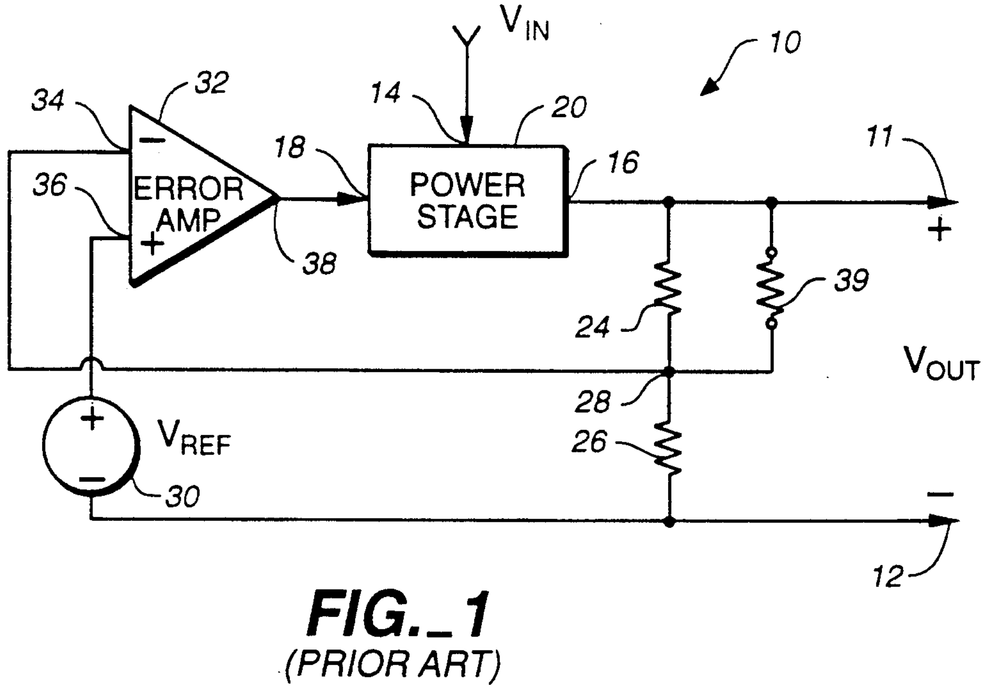
FIG. 1 (PRIOR ART)
FIG. 1 is a schematic diagram of a conventional power converter.
Figure 4A:
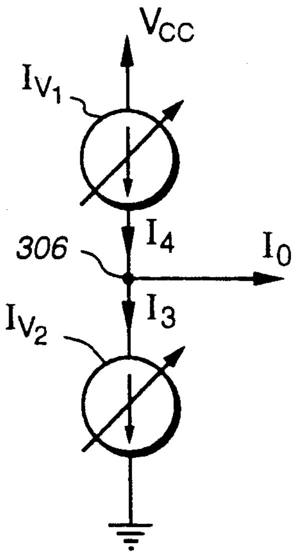
FIG. 4 is a schematic diagram of an embodiment of an adjustable power converter according to the present invention.
Figure 5A:
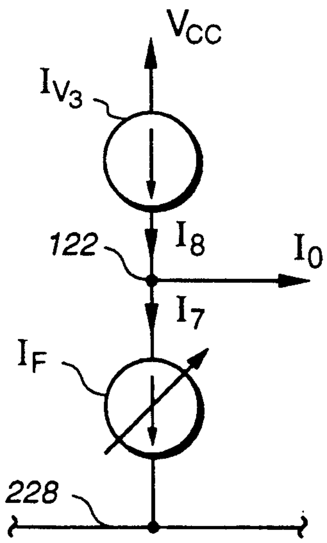
FIG. 5 is a schematic diagram of another embodiment of an adjustable power converter according to the present invention.

Output block 43 converts the voltage of a DC voltage source $V_{in}$, generally unregulated, to a regulated output voltage $V_{out}$ across ports 41, 42. The design of output block 43 is conventional and is similar to power converter 10, shown in FIG. 1. Output block 43 comprises a power stage 70, two resistors 74 and 76, a reference voltage source 80, and an error amplifier 82 having an inverting input terminal 84, a noninverting input terminal 86, and an output terminal 88. Power stage 70, resistors 74 and 76, reference voltage source 80, and error amplifier 82 are connected and function in a similar manner as power stage 20, resistors 24 and 26, reference voltage source 30, and error amplifier 32, respectively, in FIG. 1. Consequently, error amplifier 82 and power stage 70 constitute a controller for generating across output ports 41, 42 a regulated output voltage $V_{out}$ as a function of the difference between the voltage of reference voltage source 80 and the voltage at a node 78 between resistors 74, 76, a comparison voltage. Node 78 is electrically the same as node 79.

Current generation block 50 comprises a voltage to current converter 52 having a first input terminal 53 coupled to variable voltage generation block 64 which outputs a voltage $V_p$, a second input terminal 54 coupled to a voltage source 51 having a voltage of $V_{nom}$, and an output terminal 55. Voltage to current converter 52 outputs a current I from output terminal 55 when the voltage $V_p$ at first input terminal 53 is lower than the voltage $V_{nom}$ at second input terminal 54. Voltage to current converter 52 sinks a current at output terminal 55 when the voltage $V_p$ at first input terminal 53 is higher than the voltage $V_{nom}$ at second input terminal 54. The current generated or sunk by voltage to current converter 52 passes through a gate 62 and is labeled as current $I_0$ flowing between current generation block 50 and output block 43.

The current generated or sunk by a voltage to current converter typically reaches a maximum value, for example, $\pm 450\ \mu A$, when the difference in voltages between the input terminals exceeds a predetermined value, for example, ±1V. In a preferred embodiment of the present invention, when the difference in voltages between programming voltage $V_p$ present at first input terminal 53 of converter 52 and voltage $V_{nom}$ present at second input terminal 54 exceeds +1 V, the current output by currents 52 is limited to +450 μA. Similarly, when the voltage difference exceeds −1 V in the negative direction, the current is limited to −450 μA.

Variable voltage generation block 64 could be as simple as a variable voltage source. The voltage of the variable voltage source is then a programming voltage $V_p$ for adjusting the regulated output voltage $V_{out}$. Another implementation of variable voltage generation block 64 is shown in FIG. 2. It comprises a constant current source 66 and a programming resistor 67. The voltage across programming resistor 67, i.e., $V_p$, is equal to the product of the current generated by current source 66 and programming resistor 67.

Gate 62 has an ON state and an OFF state which is controlled by a signal from a comparator 56. Current is allowed to flow between voltage to current converter 52 and node 79 only when gate 62 is ON. Comparator 56 comprises a first input terminal 57 coupled to a voltage source 61 having a voltage of $V_{max}$, a second input terminal 58 coupled to variable voltage block 64 and voltage $V_p$, and an output terminal 59 for generating a signal to control gate 62. So long as the voltage $V_{max}$ at first input terminal 57 is higher than the voltage $V_p$ at second input terminal 58, the signal at output terminal 56 keeps gate 62 in an ON state so that current can flow through gate 62. When the voltage $V_{max}$ at first input terminal 57 is lower than the voltage $V_p$ at second input terminal 58, the signal at output terminal 56 places gate 62 in an OFF state so that current generation block 50 is effectively cut off from output block 43. In this case, current $I_0$ flowing between current generation block 50 and output block 43 is equal to zero.

Figure 3A:
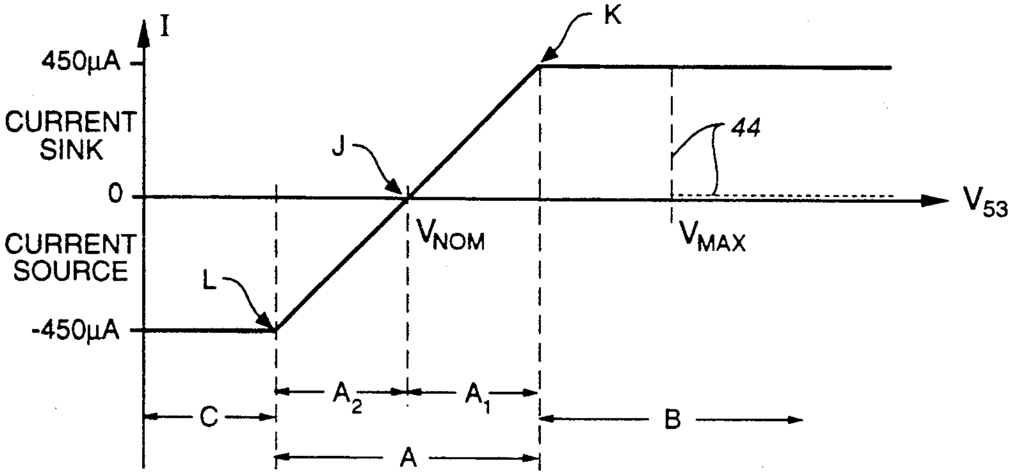
FIG. 3(*a*) is a graph showing the output current of a voltage to current converter as a function of the input voltage according to the present invention.
Figure 3B:
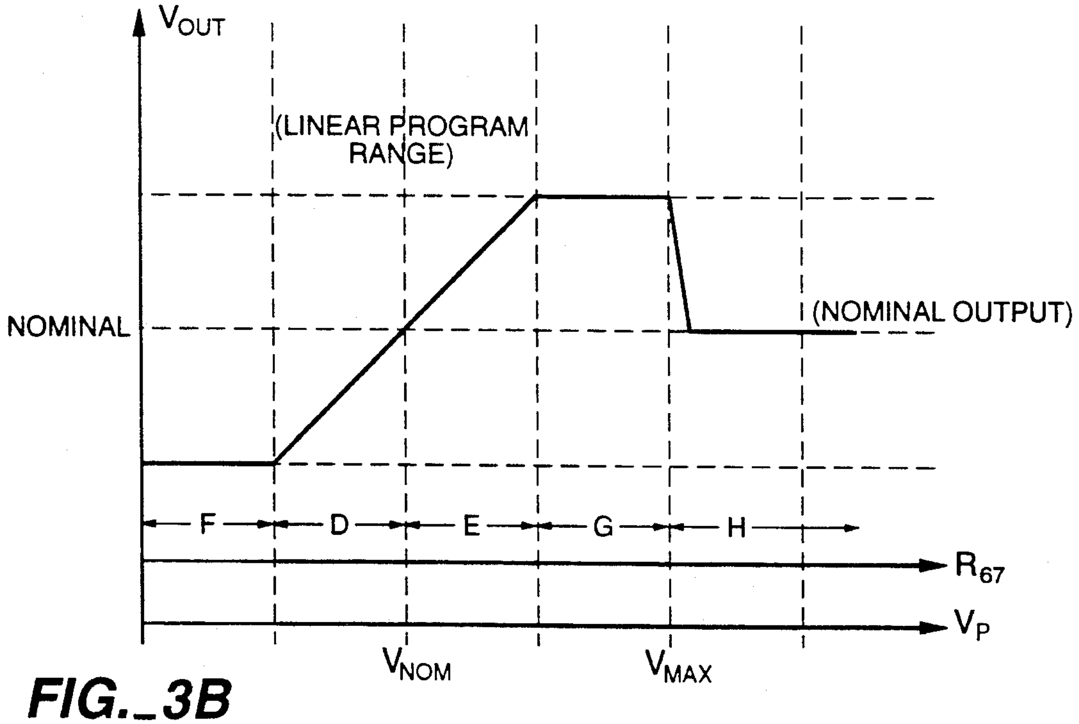

FIG. 3(*a*) is a graph showing the current I generated by voltage to current converter 52 as a function of the voltage at the first input terminal 53. Positive values of I indicate that voltage to current converter 52 sinks current, and negative values of I indicate that converter 52 generates current. Note that current I is different from current $I_0$ because gate 62 cuts off current I from output block 43 under some circumstances, as explained below.

Figure 4:
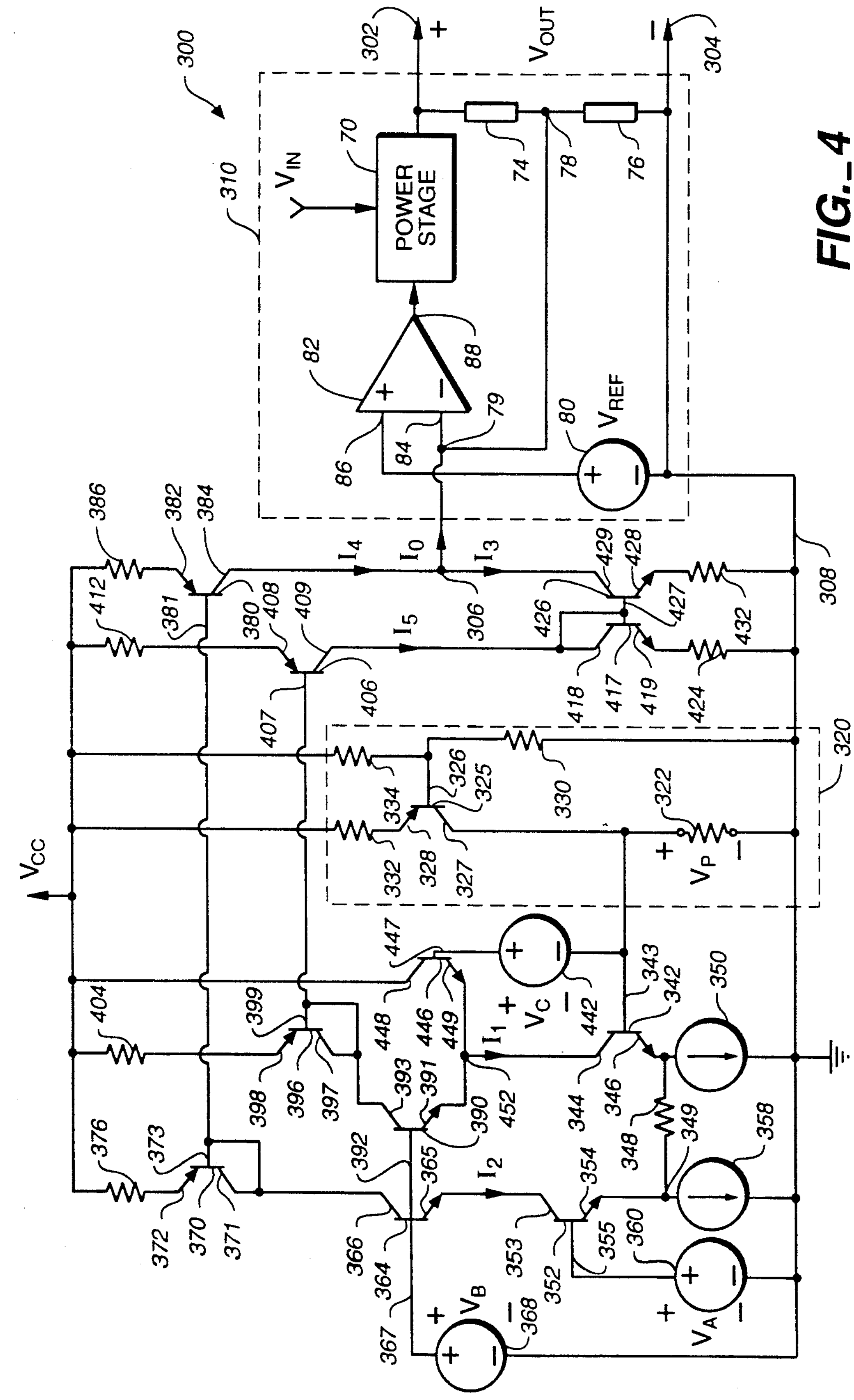

When the voltage at first input terminal 53 is equal to $V_{nom}$, voltage to current converter 52 does not generate a current. When the difference between the voltage at first input terminal 53 and $V_{nom}$ is within a range labelled as A in FIG. 3(*a*), the current generated by voltage to current converter 52 is substantially a linear function of such difference. In range $A_1$, within range A, i.e., the voltage at terminal 53 is higher than $V_{nom}$, voltage to current converter 52 is a current sink. In range $A_2$ within range A, i.e., the voltage at terminal 53 is lower than $V_{nom}$, converter 52 is a current source. In ranges B and C, the difference between the voltages at terminal 53 and voltage $V_{nom}$ exceeds the predetermined value mentioned above, for example, ±1 V. Consequently, the current I levels off, for example, to a value of ±450 μA, as explained above. An example of a circuit which generates current I is shown in FIG. 4.

When voltage $V_p$ exceeds voltage $V_{max}$, gate 62 is in an OFF state. As explained above, the current I generated by current generation block 50 is cut off from output block 43 resulting in $I_0$ being equal to zero. This is shown as dash line 44 in FIG. 3(*a*).

The effect on $V_{out}$ when current generation block 50 is a current source is described first. In this case, $I_0$ flows into node 79 of output block 43. The input resistance of error amplifier 82 of output block 43 is preferably high compared to the resistance of resistors 74 and 76. Consequently, the input current flows to a line 77, which is coupled to output port 42, through resistor 76 instead of flowing to input terminal 84 of error amplifier 82. This input current thus adds to the current flowing through resistor 76 resulting from $V_{out}$. As a result of the increased current through resistor 76, the voltage at node 78 is higher than the case when there is no input current flowing from current generation block 50 to node 79. As a result, the voltage at output terminal 88 of error amplifier 82 decreases. Consequently, power stage 70 acts to reduce $V_{out}$ until the voltage at node 78 becomes again substantially equal to the voltage of reference voltage source 80. It should therefore be clear to a person of ordinary skill in the art that $V_{out}$ is changed from its nominal value by an amount equal to $R_1{*}I_0$, where $R_1$ is the resistance of resistor 74, when current generation block 50 is acting as a current source for output block 43.

The effect on $V_{out}$ when current generation block 50 is a current sink is next described. In this case, $I_0$ flows from node 79 of output block 43 into current generation block 50. This current is obtained from the current flowing from port 41 through resistor 74 to node 78. Since the sum of the current $I_0$ and the current flowing through resistor 76 is equal to the current flowing through resistor 74, the current flowing to resistor 76 is reduced if $V_{out}$ remains unchanged. Thus, the voltage at node 78 is lower than the case when there is no current flowing from node 79 to current generation block 50. As a result, the voltage at output terminal 88 of error amplifier 82 increases. Consequently, power stage 70 acts to increase $V_{out}$ until the voltage at node 78 becomes substantially equal to the voltage of reference voltage source 80. It should therefore be clear to a person of ordinary skill in the art that $V_{out}$ will change from its nominal value, by an amount equal to $R_1{*}I_0$, where $R_1$ is the resistance of resistor 74, when current generation block 50 is acting as a current sink for output block 43.

Note that the equation in this case, i.e., where current generation block 50 is a current sink, is the same as the equation in the previous case, i.e., where current generation block 50 is a current source. However, when current generation block 50 functions as a current source, the regulated output voltage $V_{out}$ is lower than the nominal value while when current generation block 50 functions as a current sink, the regulated output voltage $V_{out}$ is higher than the nominal value.

FIG. 3(*b*) is a graph showing the dependence of $V_{out}$ on the programming voltage $V_p$ and the resistance of programming resistor 67 of power converter 40. The vertical axis represents $V_{out}$. There are two horizontal axes, one representing the programming voltage $V_p$ and the other representing the resistance of programming resistor 67. Since programming voltage $V_p$ is proportional to the resistance of programming resistor 67, the two axes are equivalent.

When programming voltage $V_p$ is equal to the voltage $V_{nom}$ of voltage source 51, $V_{out}$ is at its nominal value in steady state conditions. In range D, programming voltage $V_p$ is below $V_{nom}$ and consequently current generator block 50 functions as a current source. In this range, therefore, the output voltage $V_{out}$ is below the nominal value and varies linearly with the programming voltage $V_p$. In range E, programming voltage $V_p$ is above $V_{nom}$ and consequently current generator block 50 functions as a current sink. In this range, therefore, the output voltage $V_{out}$ is above the nominal value and varies linearly with the programming voltage $V_p$. In ranges F and G, i.e., current $I_0$ has a constant value, output voltage $V_{out}$ also has a constant value. In range H, programming voltage $V_p$ is above the voltage $V_{max}$ of voltage source 61 coupled to comparator 56. Consequently, gate 62 is set to an OFF state, causing thereby current $I_0$ to be equal to zero. As a result, output voltage $V_{out}$ returns to its nominal value. Thus, a user can adjust the regulated output voltage of power converter 40 a selected amount above and below the nominal value by adjusting the programming voltage $V_p$ or the resistance of programming resistor 67.

It should be understood by a person of ordinary skill in the art that the direction of current flow at output terminal 55 of voltage to current converter 52 is opposite to that shown in FIG. 3(*a*) if the connections to the input terminals 53 and 54 are reversed, i.e., voltage source 51 and programming resistor 67 are connected to input terminals 53 and 54, respectively. Similarly, if the connections to the input terminals 57 and 58 of comparator 56 are reversed, i.e. voltage source 61 and programming resistor 67 are connected to input terminals 58 and 57, respectively, current $I_0$ will be equal to zero when programming voltage $V_p$ is below voltage $V_{max}$.

FIG. 4 is a schematic diagram of an embodiment of an adjustable power converter 300 according to the present invention. Power converter 300 includes an output block 310 and two output ports 302 and 304. Output block 310 converts the voltage of a DC voltage source $V_{in}$, generally unregulated, to a regulated output voltage $V_{out}$ across output ports 302 and 304. The design of output block 310 is conventional and is similar to output block 43, shown in FIG. 2. The components which are common to output blocks 43 and 310, shown in FIGS. 2 and 4, respectively, have the same numeral references. Since the connections and operation of output block 310 are similar to that of output block 43, output block 310 is not described in detail here. As explained above, the deviation of the output voltage $V_{out}$ at ports 302 and 304 from the nominal value is controlled by a current $I_0$ flowing between output block 310 and a node, shown at 306 in FIG. 4, connected thereto. Current $I_0$ is in turn equal to the difference between a current $I_4$ flowing into node 306 and a current $I_3$ flowing out of node 306.

Power converter 300 further includes a variable voltage generation block 320 for generating a programming voltage $V_p$ which controls the magnitude and direction of current $I_0$. Variable voltage generation block 320 comprises a programming resistor 322 and a constant current source comprising a transistor 325 and three resistors 330, 332, and 334. Variable voltage generation block 320 corresponds to variable voltage generation block 64 in FIG. 2. The constant current source comprising transistor 325 and resistors 330, 332, and 334 corresponds to current source 66 in FIG. 2. Programming resistor 322 corresponds to programming resistor 67 in FIG. 2.

The emitter 328 of transistor 325 is coupled to resistor 332 which in turn is connected to a regulated voltage $V_{cc}$. Regulated voltage source $V_{cc}$ can either be supplied externally, or by the regulated voltage at output ports 302 and 304. The collector 327 of transistor 325 is coupled to programming resistor 322. The base 326 of transistor 325 is biased in a well known manner by resistors 330 and 334 so that a current of substantially constant value flows out of collector 327 of transistor 325 into programming resistor 322.

When the current generated by transistor 325 flows through programming resistor 322, a programming voltage $V_p$ having a value equal to the product of the current out of collector 327 of transistor 325 and the resistance of resistor 322 develops across resistor 322. As a result, programming voltage $V_p$ varies linearly with the resistance of programming resistor 322. This voltage is used to control the magnitude and direction of current $I_0$, as explained below.

FIG. 4(*a*) is a simple model showing the generation of current $I_0$ by power converter 300. A variable current source $I_{v1}$ for generating current $I_4$ is inserted between voltage $V_{cc}$ and node 306. Another variable current source $I_{v2}$ for generating current $I_3$ is inserted between node 306 and ground. Thus, if current $I_3$ is larger than current $I_4$, current $I_0$ flows towards node 306. On the other hand if current $I_3$ is lower than current $I_4$, current $I_0$ flows out of node 306.

Programming voltage $V_p$ is used to control the variation in the currents generated by both variable current sources $I_{v1}$ and $I_{v2}$. Currents $I_3$ and $I_4$ are made to vary in opposite directions from their nominal values such that the sum of their magnitudes is equal to a constant value. Thus, if current $I_3$ becomes zero, the magnitude of current $I_4$, and consequently current $I_0$ flowing out of node 306, is equal to the same constant value regardless of the magnitude of programming voltage $V_p$. Similarly, if current $I_4$ becomes zero, the magnitude of current $I_3$, and consequently current $I_0$ flowing into node 306, is equal to the same constant value regardless of the magnitude of programming voltage $V_p$. These two situations correspond to ranges B and C, shown in FIG. 3(*a*).

When neither $I_3$ nor $I_4$ is equal to zero, currents $I_3$ and $I_4$ further satisfy the condition that their difference is proportional to programming voltage $V_p$. Consequently, current $I_0$ is also proportional to programming voltage $V_p$. This situation corresponds to range A, shown in FIG. 3(*a*).

The circuit implementation of the model shown in FIG. 4(*a*) is now described. Programming resistor 322 is coupled to the base 343 of a transistor 342. Base 343 corresponds to terminal 53 of voltage to current converter 52, shown in FIG. 2. A current $I_1$ flows through the collector 344 of transistor 342. As explained below, current $I_1$ is proportional to current $I_3$ flowing out of node 306. The emitter 346 of transistor 342 is coupled to a constant current source 350 and one end of a resistor 348. Since the design of a constant current source is well known in the art, the details thereof are not shown here. An example of a constant current source has been described above using transistor 325 and resistors 330, 332, and 334.

The other end of resistor 348 is coupled to the emitter 354 of a transistor 352. The emitter 354 of transistor 352 is also coupled to a constant current source 358. The current generated by current sources 358 and 350 are preferably the same. A current $I_2$ flows through the collector 353 of transistor 352. As explained below, current $I_2$ is proportional to current $I_4$ flowing into node 306. The proportionality constant between current $I_2$ and current $I_4$ is preferably the same as the proportionality constant between current $I_1$ and current $I_3$. The base 355 of transistor 352 is coupled to a voltage source 360 having a voltage $V_a$. The voltage $V_a$ corresponds to voltage $V_{nom}$ of voltage source 51, shown in FIG. 2.

The mechanism for generating currents $I_1$ and $I_2$ is now described. The magnitude of currents $I_1$ and $I_2$ depend on the programming voltage $V_p$ present at the base 343 of transistor 342. When $V_p$ is equal to the voltage $V_a$ of voltage source 360, the voltages at emitters 354 and 346 of transistors 352 and 342, respectively, are substantially the same. Consequently, there is almost no current flowing through resistor 348. Since the current generated by current sources 350 and 358 are the same, the currents flowing through emitters 354 and 346 are also the same. Consequently, in this case currents $I_1$ and $I_2$ have the same magnitude. Since the proportionality constants between currents $I_1$ and $I_3$ and currents $I_2$ and $I_4$ are the same, currents $I_3$ and $I_4$ also have the same value. Since current $I_0$ is equal to the difference between currents $I_4$ and $I_3$, current $I_0$ is equal to zero when programming voltage $V_p$ is equal to the voltage $V_a$ of voltage source 360. This corresponds to point J of FIG. 3(*a*).

When programming voltage $V_p$ is higher than the voltage $V_a$ of voltage source 360, the voltage at emitter 346 of transistor 342 is higher than the voltage at emitter 354 of transistor 352. Consequently, a current flows from emitter 346 of transistor 342 through resistor 348 to a node 349. Since the current flowing through emitter 346 of transistor 352 is equal to the sum of the currents flowing through resistor 348 and current source 350, this emitter current, and consequently, current $I_1$, is higher than the case when $V_p$ is the same as $V_a$.

The sum of the currents flowing into node 349, i.e., the current flowing through emitter 354 of transistor 353 and the current flowing through resistor 348 to node 349, is equal to the current of current source 358. Thus, the current flowing through emitter 354 of transistor 353 is lower than the case when programming voltage $V_p$ is the same as $V_a$.

Thus, when programming voltage $V_p$ is higher than voltage $V_a$, current $I_1$ is larger than current $I_2$. Consequently, current $I_3$ is larger than current $I_4$. As a result, current $I_0$ flows from output block 310 to node 306. This corresponds to range $A_1$ in FIG. 3(*a*).

When the current flowing through resistor 348 reaches a value the same as the current flowing through current source 358, the current flowing through emitter 354 of transistor 352 is reduced to zero. Consequently, current $I_2$ is equal to zero. At the same time, the current flowing through emitter 346 of transistor 342, and consequently current $I_1$, is equal to the sum of the currents flowing through current sources 358 and 350. In this situation, current $I_2$ has been reduced to its minimum value, i.e., zero, and current $I_1$ has reached its maximum value; i.e. the sum of the currents generated by current sources 350 and 358. Thus, current $I_0$ has also reached its maximum value. This corresponds to point K in FIG. 3(*a*).

Once current $I_0$ reaches its maximum value, any further increase in programming voltage $V_p$ will not increase current $I_0$. This corresponds to region B in FIG. 3(*a*).

Turning now to the case where programming voltage $V_p$ is lower than the voltage $V_a$ of voltage source 360, the voltage at emitter 346 of transistor 342 is lower than the voltage at emitter 354 of transistor 352. Consequently, a current flows from emitter 354 through resistor 348 to emitter 346 of transistor 342. Thus, the current flowing through emitter 354, and consequently, current $I_2$, is higher than the case when $V_p$ is the same as $V_a$. At the same time, the current flowing through emitter 346 of transistor 342, and consequently, $I_1$, is lower than the case when $V_p$ is the same as $V_a$, following a similar mechanism as described above. Thus, current $I_2$ has a larger magnitude than current $I_1$. Consequently, current $I_4$ also has a larger magnitude than current $I_3$. As a result, current $I_0$ flows from node 306 to output block 310. This corresponds to range $A_2$ in FIG. 3(*a*).

When the current flowing through resistor 348 reaches a value the same as the current flowing through current source 350, the current flowing through emitter 346 of transistor 342, and consequently current $I_1$, is reduced to zero. At the same time, current $I_2$ is equal to the sum of the current flowing through current sources 358 and 350. In this situation, current $I_1$, and consequently current $I_3$, has been reduced to its minimum value, i.e. zero, and current $I_2$, and consequently current $I_4$, has reached its maximum value, i.e., the sum of the currents generated by current sources 350 and 358. This corresponds to point L in FIG. 3(*a*).

Once current $I_1$ has been reduced to its minimum value and current $I_2$ has reached its maximum value, any further decrease in programming voltage $V_p$ will not change current $I_0$. This corresponds to region C in FIG. 3(*a*).

The circuit which generates current $I_4$ flowing into node 306 having a magnitude equal to $N*I_2$ is now described, where N is a proportionality constant. The collector 353 of transistor 352 is coupled to the emitter 365 of a transistor 364. The collector 366 of transistor 364 is coupled to the collector 371 of a transistor 370. The base 367 of transistor 364 is coupled to a voltage source 368 having a voltage $V_b$. The voltage $V_b$ is selected so that transistor 364 is always in an ON state. Other requirements for selecting voltage $V_b$ is described below.

The emitter 372 of transistor 370 is coupled to a resistor 376 which is in turn coupled to $V_{cc}$. The base 373 and collector 371 of transistor 370 are coupled together. As such, transistor 370 functions as a diode. Consequently, the current flowing through transistor 370 is substantially the same as the current $I_2$ flowing through transistors 364 and 352.

The base 373 of transistor 370 is also coupled to the base 381 of a transistor 380. The emitter 382 of transistor 380 is coupled to a resistor 386 which is in turn coupled to $V_{cc}$. The collector 384 of transistor 380 is coupled to node 306. It is well known in the art that the circuit configuration involving transistors 370 and 380 forms a current "mirror" circuit such that the ratio of currents $I_4$ and $I_2$, which corresponds to proportionality constant N, is substantially equal to the ratio of resistance of resistors 376 and 386. As a result, current $I_4$ is substantially equal to N times current $I_2$.

The circuit which generates current $I_3$ flowing away from node 306 having a magnitude equal to $N*I_1$ is now described. The collector 344 of transistor 342 is coupled to the emitter 391 of transistor 390. The collector 393 of transistor 390 is coupled to the collector 397 of a transistor 396. The base 392 of transistor 390 is coupled to voltage source 368 having a voltage of $V_b$. The voltage $V_b$ is selected such that transistor 390 conducts unless programming voltage $V_p$ is above a predetermined value. As mentioned above, the detailed requirements for the selection of voltage $V_b$ will be explained below. Note, however, that transistor 364 is inserted into the path of current $I_2$ to create the same voltage drop as the voltage drop created by transistor 390 in the path of current $I_1$.

The emitter 398 of transistor 396 is coupled to a resistor 404 which is in turn coupled to $V_{cc}$. The base 399 and the collector 397 of transistor 396 are coupled together. As such, transistor 396 functions as a diode. Consequently, the current flowing through transistor 396 is substantially the same as the current $I_1$ flowing through transistors 390 and 342.

The base 399 of transistor 396 is also coupled to the base 407 of transistor 406. The emitter 408 of transistor 406 is coupled to a resistor 412 which is in turn coupled to $V_{cc}$. The collector 409 of transistor 406 is coupled to the collector 418 of a transistor 416. A current $I_5$ flows from collector 409 of transistor 406 to collector 418 of transistor 416. It is well known in the art that the circuit configuration involving transistors 396 and 406 forms a current "mirror" circuit such that the ratio of currents $I_5$ and $I_1$ is substantially equal to the ratio of resistance of resistors 404 and 412. This ratio is preferably equal to the proportionality constant N. As a result, current $I_5$ is substantially equal to N times current $I_1$.

The emitter 419 of transistor 416 is coupled to a resistor 424 which is in turn coupled to line 308. The base 417 and the collector 418 of transistor 416 are coupled together. In addition, the base 417 of transistor 416 is coupled to the base 427 of transistor 426. The emitter 428 of transistor 426 is coupled to a resistor 432 which is in turn coupled to line 308. The collector 429 of transistor 426 is coupled to node 306. The resistance of resistors 424 and 432 are preferably the same so that transistors 416 and 426 form a mirror circuit for generating a current, i.e., $I_3$, having a magnitude equal to $I_5$ which is further equal to $N*I_1$, flowing from node 306 to transistor 426.

Power converter 300 further comprises a protective circuit such that when the programming voltage $V_P$ exceeds a pre-determined value, the voltage level across ports 302, 304 is maintained at the nominal value. There are at least two situations where the programming voltage $V_P$ could exceed the pre-determined value. If programming resistor 322 is a variable resistor having a wiper, the mechanical element might fail thereby creating an open circuit. As a result, the programming voltage would $V_P$ would rise to its maximum value. If the programming voltage $V_P$ is supplied via a voltage source, a voltage source having an excessively large voltage might inadvertently be applied to power converter 300. Consequently, a protective circuit is needed in order to prevent power converter 300 from generating a high voltage which could destroy circuit elements powered by power converter 300.

The protective circuit further provides a convenient way for a user to set the output voltage of power converter 300 at the nominal value. As explained below, the protective circuit sets the output voltage of power converter 300 to the nominal value when programming resistor 322 becomes an open circuit. Thus, the user can remove programming resistor 322 from power converter 300 any time he wants the output voltage of power converter 300 to be at its nominal value.

When programming resistor 322 becomes an open circuit or when programming voltage $V_p$ exceeds a pre-determined value, the circuit of adjustable power converter 300 prevents the generation of currents $I_3$ and $I_4$ so that current $I_0$ becomes zero. As a result, the output voltage $V_{out}$ returns to its nominal voltage. The implementation of this feature in adjustable power converter 300 is now explained. Programming resistor 322 is coupled to the negative terminal of a voltage source 442 having a voltage of $V_c$. The positive terminal of voltage source 442 is coupled to the base 447 of a transistor 446. The collector 448 of transistor 446 is coupled to $V_{cc}$. The emitter 449 of transistor 446 is coupled to a node 452.

When transistor 446 is turned off, the operation of adjustable power converter 300 is not affected by the presence of transistor 446. In order to turn off transistor 446, the voltage at its base 447, which is equal to the sum of the programming voltage $V_p$ and voltage $V_c$, must be one base-emitter voltage below the voltage at node 452. Since the voltage at node 452 is also equal to one base-emitter voltage below voltage $V_b$, transistor 446 remains off so long as the sum of the programming voltage and voltage $V_c$ is less than voltage $V_b$. This is equivalent to the situation where gate 62, shown in FIG. 2, is in a ON state allowing the passage of current from voltage to current generator 52 to output block 43.

When the voltage at base 447 of transistor 446 is higher than the voltage at node 452, transistor 446 is turned on. The voltage at node 452 is now raised to a value equal to one base-emitter voltage below the voltage at base 447 of transistor 446. If this voltage is higher than the voltage $V_b$, transistor 390 is turned off. The current $I_1$ is now supplied by transistor 446 instead of transistors 390 and 396. Consequently, currents $I_5$ and $I_3$ are now reduced to zero. Since the voltage at the base 447 of transistor 446 is equal to the sum of voltages $V_c$ and $V_p$, transistor 446 is turned on and transistor 390 is turned off when programming voltage $V_p$ is higher than the difference between voltages $V_b$ and $V_c$. Thus, the current source in variable voltage generation block 320 is designed so that when programming resistor 322 becomes an open circuit, programming voltage $V_p$ is higher than the difference between voltage $V_b$ and $V_c$.

As explained above, currents $I_2$ and $I_4$ are reduced to zero when current $I_1$ is at its maximum value. Thus, the current source in variable voltage generation block 320 is designed so that when programming resistor 322 becomes an open circuit, current $I_1$ is at its maximum value. As a result, both currents $I_3$ and $I_4$ are reduced to zero. Consequently, $I_0$ is also reduced to zero thereby causing the output voltage $V_{out}$ across ports 302 and 304 to return to its nominal value.

Figure 5:
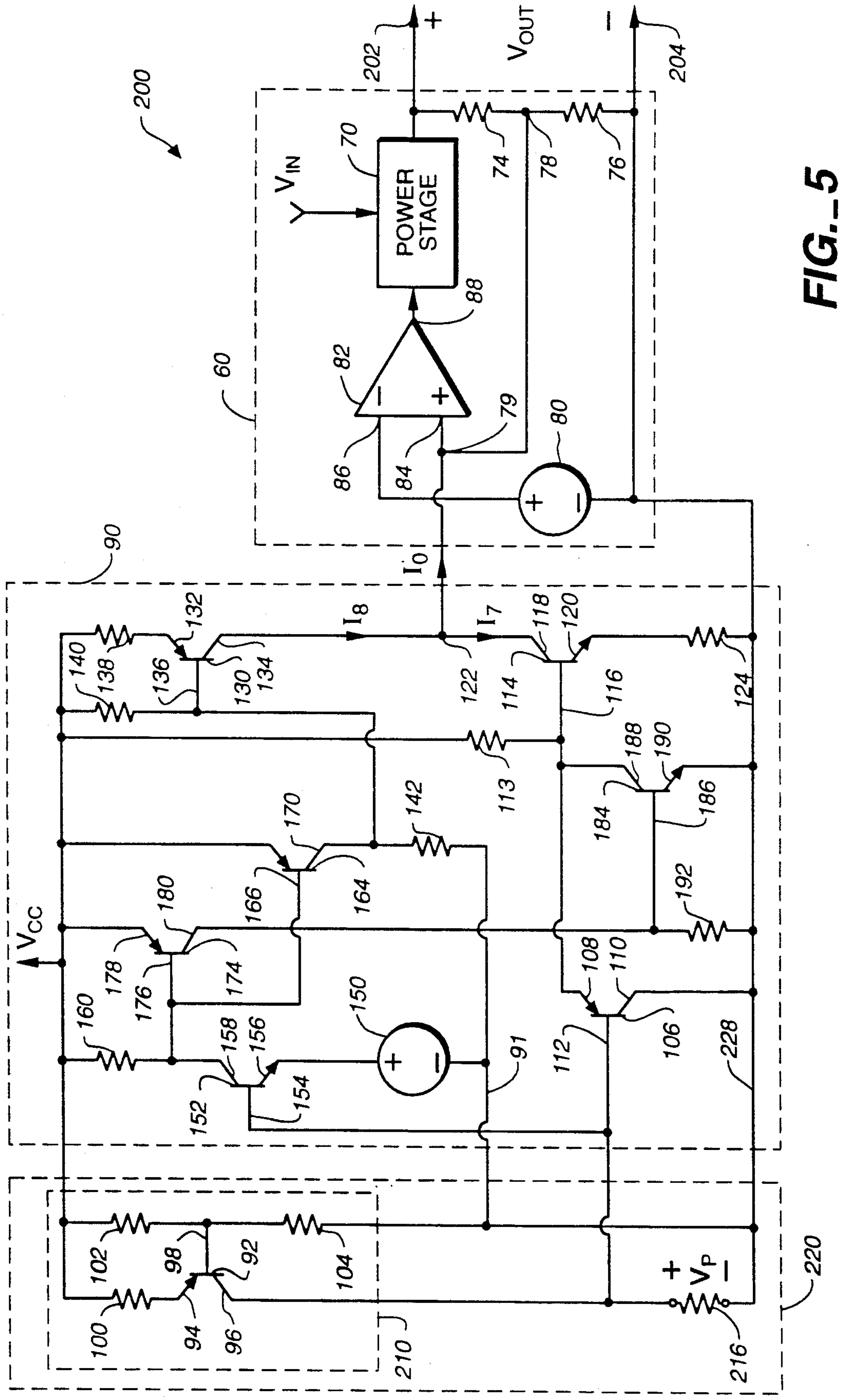

FIG. 5 is a schematic diagram of another embodiment of an adjustable power converter 200 according to the present invention. Power converter 200 comprises two output ports 202 and 204, a variable voltage generator block 220, and a current generation block 90. Variable voltage generator block 220 further comprises a programming resistor 216 and a constant current source 210. Thus, a programming voltage $V_P$ is developed across programming resistor 216 which is equal to the product of the current generated by current source 210 and the resistance of programming resistor 216. Alternatively, variable voltage generator block 220 can be replaced by a voltage source having a voltage equal to the programming voltage $V_P$.

Power converter 200 further comprises an output block 60. Output block 60 converts the voltage of a DC voltage source $V_{in}$, generally unregulated, to a regulated output voltage $V_{out}$ across ports 202, 204. The design of output block 60 is conventional and is similar to that of output block 43 of power converter 40, shown in FIG. 2. The components which are common to output blocks 43 and 60, shown in FIGS. 2 and 5, respectively, have the same numeral references. Since the connections and operation of output block 60 are similar to that of output block 43, output block 60 is not described in detail here.

As explained below, the voltage level of the regulated output at output ports 202, 204 can be linearly adjusted by a current $I_0$ flowing to or away from a node 79 in output block 60. The magnitude and direction of current $I_0$ is a function of the resistance of the programming resistor 216, or alternatively, programming voltage $V_P$.

FIG. 5(*a*) is a simple model showing the generation of current $I_0$ by current generation block 90. A variable current source $I_{v3}$ for generating a current $I_7$ as a linear function of programming voltage $V_p$ is inserted between node 122 and a line 228. A constant current source $I_f$ for generating a current $I_8$ is inserted between node 122 and a regulated voltage $V_{cc}$. Thus, if current $I_7$ is larger than current $I_8$, current $I_0$ flows to node 122. On the other hand if current $I_7$ is lower than current $I_8$, current $I_0$ flows away from node 122. As can be seen in FIG. 3(*a*) and FIG. 3(*b*), when current $I_0$ flows away from node 122, i.e., current generation block 90 functions as a current source, output voltage $V_{out}$ of output block 60 is below the nominal value. When current $I_0$ flows to node 122, i.e., current generation block 90 functions as a current sink, output voltage $V_{out}$ of output block 60 is higher than the nominal value.

Current $I_8$ preferably has a value inside the range of variation of current $I_7$. Thus, current $I_7$ can be either higher than or lower than current $I_8$, depending on the programming voltage $V_p$ applied to variable current source $I_{v3}$. Consequently, current $I_0$ can either flow towards or out of node 122.

The circuits for implementing variable current source $I_{v3}$ and constant current sources 210 and $I_f$ are now described. For providing the function of constant current source 210, programming resistor 216 has one end coupled to the collector 96 of a transistor 92 and the other end coupled to common line 228. Line 228 is coupled to output port 204. The emitter 94 of transistor 92 is coupled to a resistor 100 which is in turn coupled to a regulated voltage source $V_{cc}$. Regulated voltage source $V_{cc}$ can either be supplied externally, or by the regulated voltage at output port 202, 204. The base 98 of transistor 92 is coupled to two resistors 102, 104. The other side of resistor 102 is coupled to $V_{cc}$ while the other side of resistor 104 is coupled to common line 228.

Transistor 92 is biased by resistors 102 and 104 so that its collector functions as a constant current source for driving a current through programming resistor 216. Consequently, the programming voltage, $V_P$, developed across programming resistor 216 is proportional to the resistance of programming resistor 216.

The circuit for implementing variable current source $I_{v3}$, which generates sink current $I_7$ having a value proportional to the resistance of programming resistor 216, is now described. Current generator block 90 comprises a transistor 106 having a base 112 coupled to programming resistor 216, an emitter 108, and a collector 110. Collector 110 is coupled to common line 228. Emitter 108 of transistor 106 is coupled to the base 116 of another transistor 114. Emitter 108 of transistor 106 is also coupled to a resistor 113 which in turn is coupled to $V_{cc}$. Resistor 113 provides a base current for transistor 114. The voltage at emitter 108 of transistor 106 is equal to the voltage at base 112, i.e., $V_P$, plus the emitter-base voltage, typically about 0.6 volt, of transistor 106. The reason for inserting transistor 106 between programming resistor 216 and transistor 114 will be made apparent later.

The collector 118 of transistor 114 is coupled to node 122. The emitter 120 of transistor 114 is coupled to a resistor 124. The other end of resistor 124 is coupled to common line 228. Transistor 114 functions as a current sink for generating a sink current $I_7$ flowing from node 122 to line 228 via resistor 124. The magnitude of the sink current is substantially equal to the current flowing through resistor 124, which is equal to the voltage at emitter 120 divided by the resistance of resistor 124.

The voltage at emitter 120 of transistor 114 differs from the voltage at base 116 by the base-emitter voltage of transistor 114. At the same time, the voltage at base 116 of transistor 114, which is the same as the voltage at emitter 108 of transistor 106, differs from the voltage at base 112 of transistor 106 by the base-emitter voltage of transistor 106. Transistors 106 and 114 are preferably chosen such that their base-emitter voltages have the same characteristics. Thus, the voltage at emitter 120 of transistor 114 is substantially the same as the voltage at base 112 of transistor 106. Since the voltage at the base 112 of transistor 106 is equal to the programming voltage $V_P$ across programming resistor 216, the voltage at emitter 120 of transistor 114 is substantially the same as the programming voltage $V_P$ across programming resistor 216. As a result, the sink current $I_7$ is substantially proportional to the programming voltage $V_P$, and consequently is also substantially proportional to the resistance of programming resistor 216.

The circuit for implementing constant current source $I_f$, which generates the source current $I_8$, is now described. Source current $I_8$ is generated by a transistor 130 having an emitter 132, a collector 134, and a base 136. Emitter 132 is coupled to a resistor 138 which is in turn coupled to $V_{cc}$. Base 136 is coupled to a pair of bias resistors 140, 142. The other end of resistor 140 is coupled to $V_{cc}$ while the other end of resistors 142 is coupled to a line 91. Line 91 is electrically coupled to common line 228. The voltage at base 136 of transistor 130 is determined by the resistance of resistors 140 and 142. Thus, transistor 130 functions as a constant current source generating a source current $I_8$ flowing from collector 134 to node 122.

As was pointed out before, the magnitude of current $I_7$ should preferably vary from a value higher than the magnitude of current $I_8$ to a value lower than the magnitude of current $I_8$. Thus, the value of programming resistor 216 should preferably be chosen such that the current $I_7$ can vary in the range described above.

Power converter 200 further comprises a protective circuit such that when programming voltage $V_p$ exceeds a pre-determined value, the voltage level across ports 202, 204 is maintained at the nominal value. The protective circuit operates by turning off $I_7$ and $I_8$ when the programming voltage $V_p$ exceeds a value substantially equal to the sum of the voltage of a voltage source 150 and the base-emitter voltage of a transistor 152. The programming voltage $V_P$ is coupled to the base 154 of transistor 152. The emitter 154 of transistor 152 is coupled to the positive terminal of voltage source 150. The negative terminal of voltage source 150 is coupled to line 91. The collector 158 of transistor 152 is coupled to a resistor 160 which is in turn coupled to $V_{cc}$. Collector 158 is also coupled to the base 166 of a transistor 164. The emitter of transistor 164 is coupled to $V_{cc}$ and the collector of transistor 164 is coupled to base 136 of transistor 130.

When programming voltage $V_P$ is below the sum of the voltage of voltage source 150 and the base-emitter voltage of transistor 152, transistor 152 is turned off. As a result, the voltage at collector 158 is substantially equal to $V_{cc}$. This voltage turns off transistor 164, and consequently transistor 164 does not affect the operation of transistor 130 in generating source current $I_8$. When programming voltage $V_P$ exceeds the sum of the voltage of voltage source 150 and the base-emitter voltage of transistor 152, transistor 152 is turned on. The resistance of resistor 160 is chosen such that the voltage drop across resistor 160 is greater than the base-emitter voltage of transistor 164. As a result, transistor 164 is turned on. Thus, the voltage at collector 170 of transistor 164, and consequently base 136 of transistor 130 is substantially the same as $V_{cc}$. As a result, transistor 130 is turned off and the source current $I_8$ generated by transistor 130 is substantially equal to zero.

Collector 158 of transistor 152 is also coupled to the base 176 of transistor 174. The emitter 178 of transistor 174 is coupled to $V_{cc}$. The collector 180 of transistor 174 is coupled to the base 186 of a transistor 184 and a resistor 192. The collector 188 of transistor 184 is coupled to base 116 of transistor 114. The emitter 190 of transistor 184 is coupled to line 228.

When programming voltage $V_P$ is below the sum of the voltage of voltage source 150 and the base-emitter voltage of transistor 152, thereby turning off transistor 152, the voltage at collector 158 is substantially the same as $V_{cc}$. As a result, transistor 174 is turned off. The potential at resistor 192 is substantially equal to zero thereby turning off transistor 184. Consequently, transistor 114 is able to operate as a current sink in the manner described above. When programming voltage $V_P$ exceeds the sum of the voltage of voltage source 150 and the base-emitter voltage of transistor 152, thereby turning on transistor 152, transistor 174 is turned on in a similar manner as transistor 164, described above. The resistance of resistor 192 is chosen such that the potential at resistor 192 when transistor 174 is turned on is above the base-emitter voltage of transistor 184. As a result, transistor 184 is turned on thereby setting the voltage at base 116 of transistor 114 substantially equal to zero. Consequently, transistor 114 is turned off and sink current $I_7$ is substantially equal to zero.

To summarize, when programming voltage $V_P$ is below the sum of the voltage of voltage source 150 and the base-emitter voltage of transistor 152, the operations of transistors 130 and 114 are not affected by the protective circuit. However, when programming voltage $V_P$ exceeds the sum of the voltage of voltage source 150 and the base-emitter voltage of transistor 152, transistors 130 and 114 are turned off, thereby setting currents $I_7$ and $I_8$ to zero. As was explained above, when both $I_7$ and $I_8$ are zero, the output voltage across ports 202 and 204 is at the nominal value. Consequently, the protective circuit enables the output voltage generated by power converter 200 to be kept at its nominal value even though programming resistor 216 fails or a large programming voltage is inadvertently applied to current generation block 90.

Power converter 200, described above, allows variation of the regulated output voltage a selected amount above and below a nominal value. If it is only necessary to vary the output voltage across ports 202, 204 so that it is always adjusted above the nominal value, only $I_7$ is needed and $I_8$ can be set to zero. In this case, transistor 130 and resistors 138, 140, and 142, which generate source current $I_8$, are not needed. In addition, transistor 164 which turns off transistor 130 when the programming voltage $V_P$ is above a predetermined value, is not needed.

Various modifications of the invention, in addition to those shown and described herein, will be apparent to those skill in the art from the foregoing description and accompanying drawings. Such modifications are intended to fall within the scope of the appended claims.

What is claimed is:

1. An adjustable output voltage power converter for converting a DC voltage source to a regulated DC output voltage having a nominal value across a first and a second output port, said adjustable power converter having an input port for accepting a programming signal for adjusting the level of the regulated output DC voltage about the nominal value as a substantially linear function of said programming signal, said adjustable power converter comprising:

- a controller having a first input terminal and a second input terminal, said controller for generating across said first and said second output ports a regulated output DC voltage from said DC voltage source as a function of the difference between the signals at said first and said second input terminals;
- a first reference voltage source having a fixed reference voltage coupled to said first input terminal;
- current generation means for generating a first current as a substantially linear function of said programming signal;
- comparison signal generation means for generating a comparison signal as a linear function of the regulated output voltage across said first and second output ports and as a linear function of said first current; and
- means for coupling said comparison signal to said second input terminal, such that the level of the regulated output voltage is selectively above or below said nominal value a predetermined amount.

2. The power converter of claim 1 further comprising protection means for returning said regulated output DC voltage to said nominal value when said programming signal exceeds a predetermined value, including means for cutting off said first current from said comparison signal generation means when said programming signal exceeds said predetermined value.

3. The power converter of claim 2 wherein said programming signal is a voltage and wherein said protection means comprises:

- a gate interposed between said current generation means and said comparison signal generation means, said gate having an ON state and an OFF state, said gate allowing said first current to flow through said gate during said ON state and cutting off said first current during said OFF state;
- a second reference voltage source; and
- a comparator having a first input terminal coupled to said programming signal, a second input terminal coupled to said second reference voltage source, and an output terminal for outputting a signal for controlling the state of said gate, said comparator setting said gate to said ON state when the voltage at said first input terminal of said comparator is higher than the voltage at said second input terminal of said comparator, said comparator setting said gate to said OFF state when the voltage at said second input terminal of said comparator is higher than the voltage at said first input terminal of said comparator.

4. The power converter of claim 1 wherein said comparison signal generation means comprises:

a first resistor having a first end coupled to said first output port and a second end;

a second resistor having a first end coupled to said second output port and a second end coupled to said second end of said first resistor; and means for coupling said first current to said second end of said first resistor, said comparison signal comprising the voltage at said second end of said first resistor.

5. The power converter of claim 1 wherein said programming signal is a voltage and wherein said current generation means comprises a voltage to current converter having an input terminal coupled to said programming signal and an output terminal for outputting said first current as a substantially linear function of said programming signal.

6. The power converter of claim 5 wherein said first current generated by said voltage to current converter reaches a first constant value when said programming signal exceeds a first predetermined value and a second constant value when said programming signal falls below a second predetermined value.

7. The power converter of claim 6 wherein said current generation means comprises:

means for generating a second current, said second current having a value of zero when said programming signal exceeds said first predetermined value, having a predetermined maximum value when said programming signal falls below said second predetermined value, and having a value as a linear function of said programming signal otherwise;

means for generating a third current such that the sum of the magnitudes of said second and said third currents is substantially a constant; and means for generating said first current as a function of the difference between said second and said third currents.

8. The power converter of claim 6 wherein said current generation means comprises:

a resistor having a first end and a second end;

a first constant current source;

a first transistor having a based coupling to said programming signal, an emitter coupled to said first constant current source and said first end of said resistor, and a collector for generating a second current;

a second constant current source;

a second transistor having a base maintained at a predetermined voltage, an emitter coupled to said second constant current source and said second end of said resistor, and a collector for generating a third current; and means for generating said first current as a function of the difference between said second and third currents.

9. The power converter of claim 8 further comprising a protection means for setting said first current to zero when said programming signal exceeds a third predetermined value, said protection means comprising:

a voltage source for powering said protection means;

a second reference voltage source having a positive and a negative terminal, said negative terminal being coupled to said programming signal;

a third transistor having a collector coupled to said voltage source, an emitter coupled to said collector of said first transistor, and a base coupled to said positive terminal of said second reference voltage source;

a third reference voltage source; and a fourth transistor having an emitter coupled to said collector of said first transistor, a collector for outputting said second current, and a base coupled to said third reference voltage source, said fourth transistor being turned off when said programming signal has a voltage substantially higher than the difference between the voltages of said third and second reference voltage sources.

10. The power converter of claim 5 wherein said current generation means comprises:

means for generating a second current as a linear function of said programming signal;

means for generating a third current having a substantially constant value; the value of said third current being between the maximum and minimum values of said second current; and means for generating said first current as a function of the difference between said second and said third currents.

11. The power converter of claim 10 wherein said means for generating a second current comprises:

a first resistor having a first end coupled to said first output port and a second end; and a first transistor having an emitter coupled to said second end of said first resistor, a base coupled to a signal representative of said programming signal, and a collector coupled to said second input terminal of said controller for generating said second current.

12. The power converter of claim 11 further comprising a second transistor having an emitter coupled to said base of said first transistor, a collector coupled to said first output port, and a base coupled to said programming signal, said second transistor functioning as a diode such that the signal at said emitter of said second transistor has a voltage substantially equal to the base-emitter voltage of said second transistor above said programming signal.

13. The power converter of claim 10 further comprising a protective means for turning off said means for generating said second current when said programming signal exceeds a predetermined value.

14. The power converter of claim 13 wherein said first protective means comprises:

a first voltage source for powering said first protective means;

a first resistor having a first end coupled to said first output port and a second end;

a first transistor having a base coupled to said second end of said first resistor, an emitter coupled to said first output port, and a collector for turning off said means for generating said second current when said first transistor is turned on;

a second resistor having a first end coupled to said first voltage source and a second end;

a second transistor having a base coupled to said second end of said second resistor, an emitter coupled to said first voltage source, and a collector coupled to said second end of said first resistor for turning on said first transistor when said second transistor is turned on;

a second voltage source having a pre-determined voltage; and a third transistor having a base coupled to said programming signal, an emitter coupled to said second voltage source, and a collector coupled to said second resistor for turning on said second transistor when said programming signal exceeds said predetermined valve.

15. The power converter of claim 10 wherein said means for generating said third current comprises:

a first voltage source for powering said means for generating said third current;

a first resistor having a first end coupled to said first voltage source and a second end;

a first transistor having a base, an emitter coupled to said second end of said first resistor, and a collector coupled to said second input terminal of said controller for generating said third current;

a second resistor having a first end coupled to said first voltage source and a second end coupled to said base of said first transistor; and a third resistor having a first end coupled to said first output port and a second end coupled to said base of said second transistor, said second and said third resistors for biasing said first transistor so that said first transistor functions as a constant current source.

16. The power converter of claim 15 further comprising a protective means for turning off said means for generating said third current when said programming signal exceeds a predetermined value.

17. The power converter of claim 16 wherein said protective means comprising a fourth resistor having a first end coupled to said first voltage source and a second end;

a second transistor having a base coupled to said second end of said fourth resistor, an emitter coupled to said first voltage source, and a collector coupled to said base of said first transistor for turning off said first transistor when said second transistor is turned on;

a second voltage source having a pre-determined value; and a third transistor having a base coupled to said programming signal, an emitter coupled to said second voltage source, and a collector coupled to said fourth resistor for turning on said second transistor when said programming signal exceeds said predetermined value of said second voltage source.

18. An adjustable output voltage power converter for converting a DC voltage source to a regulated output voltage having a nominal value across a first and a second output port, said adjustable power converter having an input port for accepting a programming resistor for adjusting the regulated output voltage about the nominal value as a substantially linear function of said programming resistor, said adjustable power converter comprising:

a controller having a first input terminal and a second input terminal, said controller controlling the amount of power transferred from the DC voltage source to said first and said second output ports as a function of the difference between the signals at said first and said second input terminals;

a reference voltage source having a fixed reference voltage coupled to said first input terminal;

a first resistor having a first end coupled to said first output port and a second end;

a first transistor having a base, an emitter coupled to said second end of said first resistor, and a collector coupled to said second input terminal;

a second transistor having a base coupled to said programming resistor, an emitter coupled to said base of said first transistor, and a collector coupled to said first output port;

a second resistor having a first end coupled to said first voltage source and a second end;

a third transistor having an emitter coupled to said second end of said second resistor, a collector coupled to said programming resistor, and a base;

a third resistor having a first end coupled to said first voltage source and a second end coupled to said base of said third transistor;

a fourth resistor having a first end coupled to said first output port and a second end coupled to said base of said third transistor;

a fifth resistor having a first end coupled to said first voltage source and a second end;

a fourth transistor having a base, an emitter coupled to said second end of said fifth resistor, and a collector coupled to said second input terminal of said controller;

a sixth resistor having a first end coupled to said first voltage source and a second end coupled to said base of said fourth transistor; and a seventh resistor having a first end coupled to said first output port and a second end coupled to said base of said fourth transistor.

19. The power converter of claim 18 further comprising a protective means for turning off said first and fourth transistors when the resistance of said programming resistor exceeds a predetermined value, said protective means comprising:

a eighth resistor having a first end coupled to said first output port and a second end;

a fifth transistor having a base coupled to said second end of said eighth resistor, an emitter coupled to said first output port, and a collector for turning off said first transistor when said fifth transistor is turned on;

a ninth resistor having a first end coupled to said first voltage source and a second end;

a sixth transistor having a base coupled to said second end of said ninth resistor, an emitter coupled to said first voltage source, and a collector coupled to said second end of said eighth resistor for turning on said fifth transistor when said sixth transistor is turned on;

a second voltage source having a predetermined voltage;

seventh transistor having a base coupled to said programming resistor, an emitter coupled to said second voltage source, and a collector coupled to said ninth resistor for turning on said sixth transistor when the voltage at said programming resistor exceeds said predetermined voltage; and a eighth transistor having a base coupled to said base of said sixth transistors, an emitter coupled to said first voltage source, and a collector coupled to said base of said fourth transistor.

20. In a power converter for converting a DC voltage source to a regulated output DC voltage including a first and a second output port, a controller having a first and a second input terminal, said controller generating across said first and said second output ports said regulated output DC voltage from said DC voltage source as a function of the difference between the signals at said first and said second input terminals of said controller, a first reference voltage source having a fixed reference voltage coupled to said first input terminal of said controller, comparison signal generation means having an input terminal and an output terminal, said comparison signal generation means generating a comparison signal at its output terminal as a linear function of a signal at its input terminal, means for coupling a signal representative of the regulated output DC voltage to said input terminal of said comparison signal generation means, means for coupling said comparison signal to said second input terminal of said controller, and means for adjusting said regulated output DC voltage as a linear function of an input programming signal, said adjustment means comprising:

current generation means for generating a first current as a substantially linear function of said programming signal; and means for coupling said first current to said input terminal of said comparison signal generation means such that said comparison signal is a linear function of the regulated output voltage across said first and said second output ports and a linear function of said first current.

21. The power converter of claim 20 wherein said current generating means comprises:

a first current source for generating a second current as a substantially linear function of said programming signal;

a second current source for generating a third current having a substantially constant magnitude; and means for generating said first current as a function of the difference between said second and said third currents.

22. The power converter of claim 20 wherein said first current generated by said current generation means reaches a first constant value when said programming signal exceeds a first predetermined value and a second constant value when said programming signal falls below a second predetermined value.

23. The power converter of claim 22 wherein said current generating means comprises:

means for generating a second current, said second current having a predetermined minimum value when said programming signal exceeds said first predetermined value, having a predetermined maximum value when said programming signal falls below said second predetermined value, and having a value as a linear function of said programming signal otherwise;

means for generating a third current such that the sum of the magnitudes of said second and said third currents is substantially a constant; and means for generating said first current as a function of the difference between said second and said third currents.

24. The power converter of claim 23 wherein said predetermined minimum value is zero.

* * * * *